Sept. 12, 1933.  J. M. PIERCE  1,926,307
HYDRAULIC LOADING DEVICE
Filed April 2, 1931   3 Sheets-Sheet 2
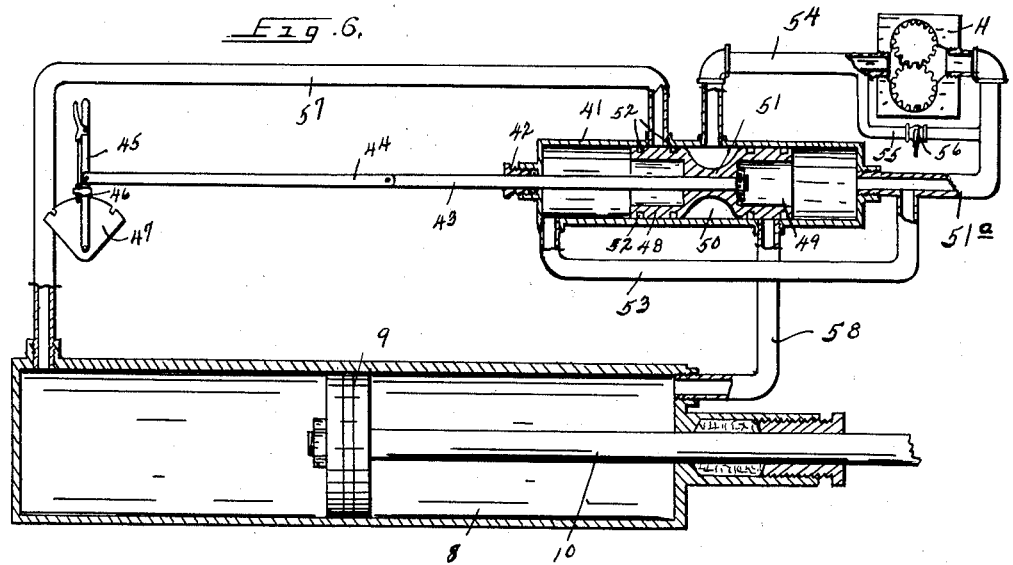
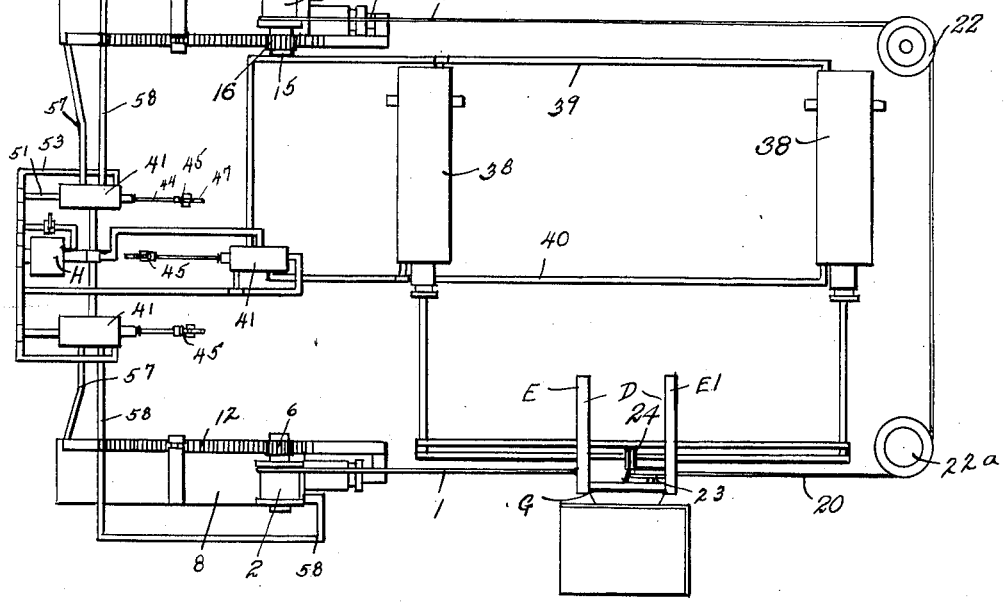
Inventor
James M. Pierce
By R. M. Thomas
Attorney

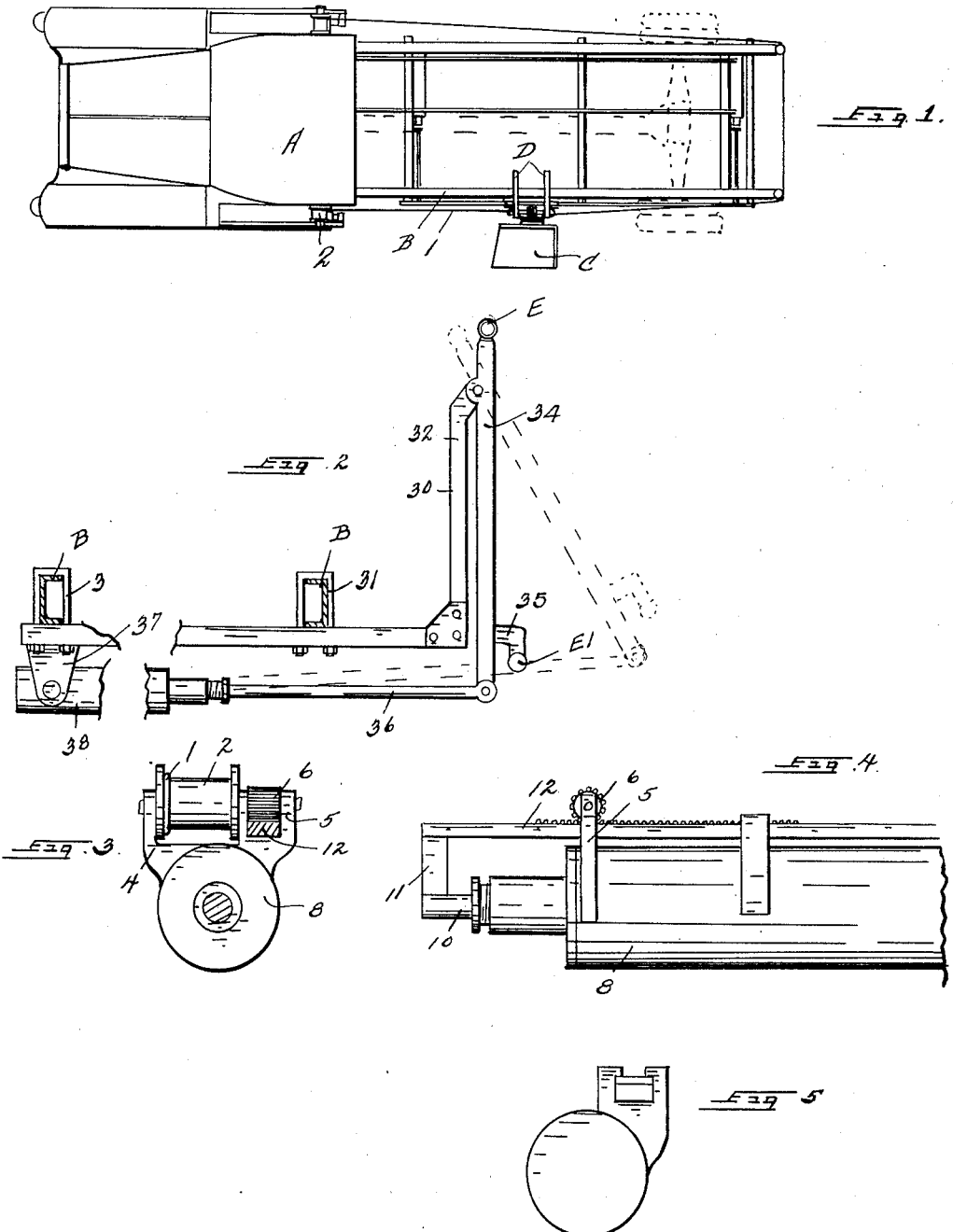

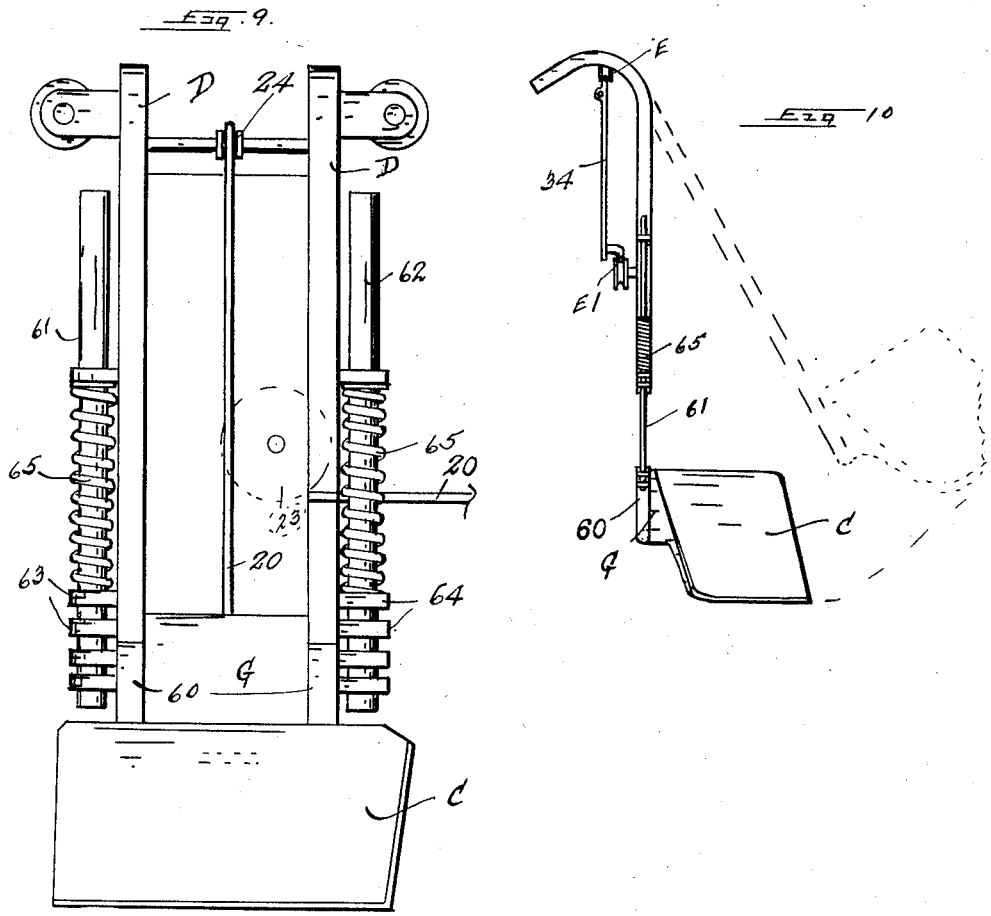

Patented Sept. 12, 1933

1,926,307

UNITED STATES PATENT OFFICE 1,926,307

HYDRAULIC LOADING DEVICE

James M. Pierce, Ogden, Utah, assignor of one-half to Ora Bundy, Ogden, Utah

Application April 2, 1931. Serial No. 527,161

3 Claims. (Cl. 214—80)

My invention relates to trucks and more particularly to loading heavy trucks by means of a hydraulically operated scoop.

A further object is to provide a truck loading device which may be operated from the cab of the truck by the driver, thereby eliminating the necessity of other workmen.

A still further object is to provide a truck loading device which will be so constructed as to provide a control for hydraulically loading a truck, which truck loader is run along a track mounted adjacent the body of the truck and which truck is so mounted as to allow the lower portion thereof to be extended from the side, to extend the area traveled and covered by the loading scoop.

A still further object is to provide a scoop that will cut outwardly, upwardly and forwardly, at the same time.

A still further object is to provide a truck loading device for loading trucks, which is hydraulically operated and which is controlled by sliding valves for directing the flow of fluid into desired cylinders operating longitudinally movable pistons therein to actuate the desired moving parts. This operation is used to wind elevating and moving cables on drums or to allow them to unwind from the drums, as necessary to operate the loading of the truck, thereby providing reversible action for the drums.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the best and most preferred manner of building my invention Figure 1 is a plan view of the truck chassis with the operating device for the elevator shown diagrammatically.

Figure 2 is an enlarged view of a portion of the chassis showing the means of extending or tilting the tracks so that the loading scoop might be extended farther out to the side extending the scope of the truck from one stationary position.

Figure 3 is an end view of one of the scoop operating cylinders with the rack and pinion and cable drum shown thereon.

Figure 4 is a side elevation of the front portion of one of the operating cylinders.

Figure 5 is a view of one of the guide bearings for the rack to operate within.

Figure 6 is a diagrammatic view of one of the control valves, and one of the operating cylinders, parts shown sectioned diametrically and parts shown in elevation.

Figure 7 is a diagrammatic plan view of the entire operating mechanism pump, control valves and operating cylinders, to show the hook up of the valves and cooperating parts.

Figure 8 is a side elevation of the truck with the device shown thereon with the body of the truck not shown.

Figure 9 is an enlarged side view of the elevating scoop.

Figure 10 is a view of the elevating device shown in extended position for reaching out for a load of material to fill the scoop.

In the drawings I have shown the truck as A, the chassis as B, and the leading scoop as C with the elevation tracks in Figure 1 as D. The scoop C is operated on rollers carried in the vertical tracks D and a cable 1 is attached to one side of the vertical tracks by which the entire assembly of scoop and operating mechanism is moved from the rear of the truck to the front end thereof. The cable 1 is wound around a drum 2, carried on a shaft 7, within a support bearing 4. The bearing 4 is provided with a support 5 for a pinion 6 carried on the same shaft 7 as the drum 2, and the entire bearing is secured to and supported on the top side of a cylinder 8, which cylinder has a piston 9 operated longitudinally therein by fluid pressure. A connecting rod 10 attached to the piston is extended out one end thereof and has an offset connection 11 secured onto the free end thereof said connection being secured to the end of a rack 12. The rack 12 is operated through the bearing 4 operating the pinion 6 and rotating the pinion when the piston rod and rack are moved longitudinally within the cylinder by fluid pressure. This either winds the cable 1 onto the drum 2 or allows the cable to be unwound therefrom, depending upon the direction of travel of the piston and rack. A similar cylinder 13 is mounted on the opposite side of the truck and is provided with like bearings 14, support 15, pinion 16, shaft 17, and connecting rod 19, built and operated in a like manner with a cable 20 adapted to be wound or unwound from the drum 21, carried on the shaft 17. This cable 20 is extended back to the rear of the chassis over a sheave wheel 22, across the chassis to the opposite side and over a sheave wheel 22a, thence front to the elevating device, where the cable is passed over a sheave wheel 23, up around a sheave wheel 24, and down to the scoop chassis G where it is secured. This cable operates the scoop C and tracks D backward along the chassis or when the cable 1 is held stationary the cable 20 then elevates the loaded scoop over the tracks D from which the scoop is dumped into the body of the truck.

The tracks D are carried on a longitudinally disposed set of horizontal spaced apart tracks E and E1, which tracks are carried pivotally secured to spaced apart angled braces 30, secured to the chassis B of the truck, by U-clamps 31 and having the angled end 32 extending upwardly from the chassis at right angles thereto with the end of the braces supporting the vertical struts 34 of the tracks E and E1. The track E1 is set out and turned down from the struts and from the vertical alignment of the track E by brackets 35 spacing the said track out from the vertical struts 34. The struts 34 are extended down below the track E1 and the ends of the said struts are pivotally secured to the free end of a connecting rod 36, which rod is secured to a piston carried in an operating cylinder 38, which cylinder is pivotally carried under the chassis of the truck in brackets 37. This cylinder is identical with that used to wind the cables on the drums heretofore described. This is to provide operating cylinders so that when fluid pressure is introduced back of the piston it will move the length of the cylinder 38, thereby forcing the rod 36 outwardly, pivoting the tracks E and E1 on the braces 30, extending the lower track outwardly from the side of the truck, thereby greatly enlarging the scope of operations of the device. There are two of these operating cylinders for operating the tracks to and from the truck chassis and each cylinder is identical and the two are connected in series by pipes 39 leading into one end of the cylinder and pipes 40 leading into the other end. The pipes are connected with suitable control valves which will be described hereafter and which valves control the direction of travel of the piston by introducing the fluid into either end of the cylinder as desired.

The valves for controlling the fluid to the cylinders are all the same so I will describe but one of them. The valves are carried in cylinders 41 having both ends closed and with a packing gland 42 in one end through which a control shift rod 43 is passed. The rod 43 is actuated by a link 44 connected with a handle 45 with a dog 46 thereon to fit into a sector 47 to hold the rod in any desired position. The inner end of the rod is secured to piston sliding piston type valve members 48 and 49 secured spaced apart at 50, by the constricted portion 51. Each valve member is provided with spaced apart piston rings 52 carried therein in suitable grooves. Into each valve cylinder there are inlet and outlet pipes, one pipe 51a into one end of the cylinder from the pressure side of a gear pump H, and another pipe 53 is connected to the pipe 51a and leads into the opposite end of the cylinder to introduce fluid under pressure into both ends of the cylinder. A return flow pipe 54 is introduced into the cylinder medially of the travel of the valve members, to carry the fluid back to the pump and complete the circuit.

A valve 56 is carried in a by pass pipe 55, said valve to control the flow of fluid through the by pass when it is desired to leave the pump idling, operating, but not operate the cylinders thereby. Leading from the sides of the valve cylinders 41 to each end of the operating cylinders 8, 13 or 38, I provide power pipes 57 and 58. Thus when the piston valve is in the position shown in Figure 6, the cylinder piston is not operating in either direction, but when the piston valve members 48 and 49 are moved to the right by the operator, actuating the lever handle 45, the pressure of the pump forces the fluid through the line 51a into the line 53 and into the end of the cylinder valve and thence through the line 57 into the end of the cylinder 8, operating the piston in the cylinder and forcing the fluid in the cylinder on the other side of the piston out through the line 58 into the valve cylinder between the valve members 48 and 49 and back to the pump through the line 51a.

To operate the cylinder in the opposite direction the handle is shifted to the opposite end of the throw and oil from the pump is then forced through the line 51 into the cylinder 41 and out through line 58 into the end of the cylinder 8, forcing the piston the other direction through the cylinder, thereby returning the oil from the other end of the cylinder through the line 57 and the line 54 back to the pump. The by pass of the pump being only used when it is desired to idle the pump and not operate either piston.

The extension of the end of the carrying track D is provided by cutting the lower end of the tracks into two sections leaving a section 60 below the tracks and connecting the two sections by guide bars 61 and 62 carried in suitable sliding bearings 63 and 64 with heavy springs 65 carried on each bar to return the sections together when the load has been removed from the end by elevating the scoop. The scoop when extended to the bottom of the tracks is of sufficient weight to flex the spring and continue down until the surface of the material being loaded is encountered or until the springs have reached their limit of flexibility.

When the cable 20 is then wound on the drum 21 the scoop is raised or drawn to the rear of the truck, depending upon whether the cable 1 is held rigid on the drum. If the cable 1 is held then the scoop will raise, but if the drum is free to run and allow the cable to be unwound therefrom the cable 20 will then draw the tracks D and the scoop to the rear of the truck preparatory to loading. To load the scoop the cable 1 is wound on the drum 2 and the cable 20 allowed to run free from the drum 21. This draws the tracks D forward along the side of the body of the truck with the weight of the scoop dragging into the material being loaded until the scoop is filled. The cable 1 is then stopped and held rigid and the cable 20 is wound on the drum 21 which raises the scoop and assembly up the tracks D dumping the load into the truck body. The cable 20 is then unwound from the drum 21 allowing the scoop to fall to the surface of the loading material. The drum 2 is then unlocked and the cable 20 wound on the drum 21 drawing the scoop and tracks to the rear of the truck for another load. When it is desired to load into a bank the scoop may be raised by the cable 21 at the same time that it is extended laterally by forcing the tracks E and E1 into the position shown in Figure 10.

By various manipulations of the drums, cables and operating cylinders the scoop may be loaded forward, outward, forward and outward, and forward outward and upward or outward and upward, depending upon which movement is desired.

Having thus described my invention I desire to secure by Letters Patent and claim:

1. In a truck loading device the combination of upper and lower longitudinal tracks secured to a frame which is pivotally secured to the chassis of the truck; vertical tracks having a carriage operating therein, carried on said longitudinal tracks; a scoop secured to said carriage; a fluid operating cylinder mounted on one side of said truck; a drum rotated by the movement of the piston within said cylinder; a cable attached to said drum around the back of the truck and front to said vertical tracks, over a sheave wheel and secured to said scoop, by which cable said scoop is raised and said vertical tracks are moved back along said truck chassis; means to hold the vertical tracks stationary, means to move the vertical tracks forward on the longitudinal tracks and means to pivot the longitudinal tracks moving the lower track out from the side of the body.

2. In a hydraulic truck loading device the combination of upper and lower horizontal tracks secured to a frame which is pivotally supported along one side of the truck chassis; a scoop carrying set of vertical tracks mounted longitudinally movable thereon; a scoop carriage carried in said tracks to which the scoop is secured; means to raise the scoop on said vertical tracks to dump the load into the truck; means including hydraulic cylinders to move said vertical tracks and scoop forward and backward on said horizontal tracks; and means including hydraulically operated cylinders to pivot said horizontal tracks extending the lower track outward to extend the scope of the scoop.

3. In a device of the class described the combination of horizontal tracks carried in a frame which is pivotally secured to a truck chassis, said tracks carrying rollers on which vertical scoop carrying tracks are operated; hydraulic cylinders to move the lower side of said horizontal tracks out from the truck; cables wound about hydraulically operated drums to move the vertical tracks forward and backward on said tracks and to elevate the scoop in said vertical tracks; and means to control the movement of said hydraulic means.

JAMES M. PIERCE.